(12) United States Patent
Yang et al.

(10) Patent No.: US 11,395,010 B2
(45) Date of Patent: Jul. 19, 2022

(54) MASSIVE PICTURE PROCESSING METHOD CONVERTING DECIMAL ELEMENT IN MATRICES INTO BINARY ELEMENT

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Limin Yang, Beijing (CN); Zhao Liu, Beijing (CN); Tao Xue, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 389 days.

(21) Appl. No.: 16/642,095

(22) PCT Filed: Jul. 25, 2018

(86) PCT No.: PCT/CN2018/097010
§ 371 (c)(1),
(2) Date: Feb. 26, 2020

(87) PCT Pub. No.: WO2019/047628
PCT Pub. Date: Mar. 14, 2019

(65) Prior Publication Data
US 2020/0204832 A1 Jun. 25, 2020

(30) Foreign Application Priority Data
Sep. 8, 2017 (CN) .......................... 201710804971.5

(51) Int. Cl.
H04N 7/12 (2006.01)
H04N 19/93 (2014.01)
(Continued)

(52) U.S. Cl.
CPC ............. *H04N 19/93* (2014.11); *G06F 16/54* (2019.01); *G06F 16/55* (2019.01); *G09G 5/39* (2013.01);
(Continued)

(58) Field of Classification Search
CPC ....................................... H04N 19/93
See application file for complete search history.

(56) References Cited

U.S. PATENT DOCUMENTS

2012/0243784 A1 9/2012 Fukuhara et al.
2014/0092971 A1 4/2014 Misra
2016/0103869 A1 4/2016 Raufman

FOREIGN PATENT DOCUMENTS

CN 101030365 A 9/2007
CN 101930614 A 12/2010
(Continued)

OTHER PUBLICATIONS

Research of information hiding algorithm based on bit-plane and HVS.
(Continued)

Primary Examiner — Y Lee
(74) Attorney, Agent, or Firm — Qinghong Xu

(57) ABSTRACT

The present disclosure provides a massive picture processing method, a massive picture processing device, an electronic apparatus and a computer readable storage medium, relating to the technical field of data processing. Said method comprises: acquiring matrixes corresponding to a plurality of channels of respective picture in massive pictures, and performing bit-based layering on respective matrixes; storing, according to an inverted index structure, picture-bit-layered data corresponding to respective channels after bit-based layering, and generating a picture-layer index record file; decoding all the picture-layer indexes of
(Continued)

the picture according to the picture-layer index record file and synthesizing the picture according to the decoding result.

20 Claims, 7 Drawing Sheets

(51) Int. Cl.
    *H04N 19/39*    (2014.01)
    *G06F 16/55*    (2019.01)
    *G06F 16/54*    (2019.01)
    *H04N 19/46*    (2014.01)
    *H04N 19/44*    (2014.01)
    *G09G 5/39*    (2006.01)

(52) U.S. Cl.
    CPC ............. *H04N 19/39* (2014.11); *H04N 19/44* (2014.11); *H04N 19/46* (2014.11)

(56) References Cited

FOREIGN PATENT DOCUMENTS

| | | |
|---|---|---|
| CN | 103731448 A | 4/2014 |
| CN | 103955514 A | 7/2014 |
| CN | 105245888 A | 1/2016 |
| CN | 106023122 A | 10/2016 |
| CN | 106612435 A | 5/2017 |
| CN | 107005715 A | 8/2017 |

OTHER PUBLICATIONS

The CN10A issued Sep. 27, 2020 by the CNIPA.
The 1st Office Action dated Oct. 26, 2021 for IN patent application No. 202037006328.
The ISR dated Oct. 26, 2018 by the WIPO.

MASSIVE PICTURE PROCESSING METHOD CONVERTING DECIMAL ELEMENT IN MATRICES INTO BINARY ELEMENT

CROSS-REFERENCE TO RELATED APPLICATIONS

This application is based upon International Application No. PCT/CN2018/097010, filed on Jul. 25, 2018, which is based upon and claims the priority of the Chinese Patent Application No. 201710804971.5, filed with the Chinese Patent Office on Sep. 8, 2017, the entire contents of which are hereby incorporated by reference.

TECHNICAL FIELD

The present disclosure relates to the technical field of data processing, and in particular, to a method for processing massive pictures and an apparatus, an electronic device and a computer-readable storage medium for processing massive pictures.

BACKGROUND

With the rapid development of Electronic Commerce (e-commerce), for each major website platform, its internal system will store massive pictures, for example, there are massive product pictures and pictures regarding product details on e-commerce websites. Because the processing of massive pictures and data consumes a large amount of storage media and transmission bandwidth, it is necessary to process the massive data to improve the storage and transmission speed.

In the art related to the method for processing massive pictures, people focus on improving the storage and reading speed of pictures and the management of massive information. In this way, the processing of massive pictures will take up plenty of storage space and network transmission bandwidth because of a large amount of picture storage, which leads to the slow transmission speed.

It should be understood that information disclosed in the background section above is only for enhancing the comprehension of the background of the present disclosure, and thus may comprise information that does not constitute prior art known to those ordinary skilled in the art.

SUMMARY

According to a first aspect of the present disclosure, there is provided a method for processing massive pictures, which comprises:

acquiring matrixes corresponding to a plurality of channels of respective picture in massive pictures, and performing bit-based layering on respective matrixes;

storing, according to an inverted index structure, picture-bit-layered data corresponding to respective channels after bit-based layering, and generating a picture-layer index record file, wherein the inverted index structure comprises a plurality of picture-layer indexes; and decoding all the picture-layer indexes of the picture according to the picture-layer index record file and synthesizing the picture according to the decoding result.

In an exemplary embodiment of the present disclosure, performing bit-based layering on respective matrixes comprise:

converting respective decimal element in the matrixes corresponding to respective channels into binary element, and performing bit-based layering on the matrixes corresponding to respective channels according to a binary bit.

In an exemplary embodiment of the present disclosure, after performing bit-based layering on respective matrixes, the method further comprises:

performing a calculation of correlation on matrixes corresponding to each layer of respective channels, and acquiring discernibility matrixes corresponding to the correlation; and performing run-length encoding on the discernibility matrixes to acquire a plurality of picture-bit-layered data corresponding to each layer of respective channels.

In an exemplary embodiment of the present disclosure, storing, according to an inverted index structure, picture-bit-layered data corresponding to respective channels after bit-based layering comprises:

calculating an index value of the picture-bit-layered data, and finding an index row matching the index value in the inverted index structure;

adding a row of picture-layer index record into the inverted index structure, when the index row matching the index value is not found; and detecting whether the picture-bit-layered data completely matches with a picture-bit-layered data stored in the inverted index structure, when the index row matching the index value is found.

In an exemplary embodiment of the present disclosure, detecting whether the picture-bit-layered data completely matches with a picture-bit-layered data stored in the inverted index structure comprises:

adding a marker corresponding to a picture-layer into the inverted index structure, when it is detected that the picture-bit-layered data completely matches with a picture-bit-layered data stored in the inverted index structure; and recalculating the index value, when it is detected that the picture-bit-layered data does not completely match with a picture-bit-layered data stored in inverted index structure.

In an exemplary embodiment of the present disclosure, decoding all the picture-layer indexes of the picture comprises:

decoding all the picture-layer indexes of the picture according to the picture-layer index record file, and finding compressed picture-bit-layered data corresponding to the picture according to the picture-layer index;

performing run-length decoding on the compressed picture-bit-layered data to acquire uncompressed raw picture-bit-layered data matrixes corresponding to the picture; and performing exclusive OR operation on the raw picture-bit-layered data matrixes to acquire unlayered raw matrixes corresponding to a plurality of channels of the picture and synthesize the picture according to the raw matrixes.

In an exemplary embodiment of the present disclosure, the method further comprises:

checking the picture generated according to the decoding result by the use of the index value.

According to an aspect of the present disclosure, there is provided an apparatus for processing massive pictures, which comprises:

a layering module configured to acquire matrixes corresponding to a plurality of channels of respective picture in massive pictures, and perform bit-based layering on each of the matrixes:

a storing module configured to store, according to an inverted index structure, picture-bit-layered data corresponding to respective channels after bit-based layering, and generate a picture-layer index record file, wherein the inverted index structure comprises a plurality of picture-layer indexes; and a decoding module configured to decode all the picture-layer indexes of the picture according to the picture-layer index record file, and synthesize the picture according to the decoding result.

According to an aspect of the present disclosure, there is provided a computer-readable storage medium on which computer program is stored, and the computer program, when executed by a processor, implements any one of the above-mentioned methods for processing massive pictures.

According to an aspect of the present disclosure, there is provided an electronic device, which comprises:

a processor; and a memory for storing executable instructions of the processor;

wherein, the processor is configured to perform any one of the above-mention methods for processing massive pictures by executing the executable instruction.

It is to be understood that both the foregoing general description and the following detailed description are exemplary and explanatory only and should not be taken as limiting the present disclosure.

BRIEF DESCRIPTION OF THE DRAWINGS

The accompanying drawings, which are incorporated in the specification and constitute a part of the specification, show the embodiments in compliance with the present disclosure, and are used to interpret the principle of the present disclosure together with the description. It is apparent that the drawings in the following description are only some embodiments of the present disclosure, from which, other drawings may be acquired by those ordinary skilled in the art without paying any creative labor.

DETAILED DESCRIPTION

Figure 1:
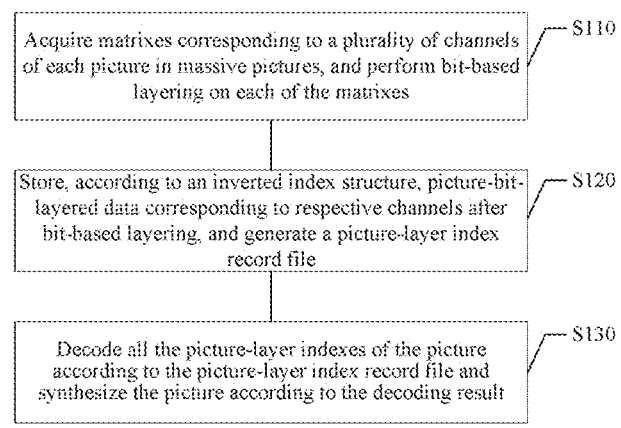
FIG. 1 is a schematic diagram schematically illustrating a method for processing massive pictures in an exemplary embodiment of the present disclosure.

Exemplary embodiments will now be described more fully with reference to the accompanying drawings. However, the exemplary embodiments may be embodied in many forms and should not be construed as limited to the examples set forth herein; rather, these embodiments are provided so that this disclosure will be more thorough and complete, and will fully convey the concept of the exemplary embodiments to those skilled in the art. Furthermore, the described features, structures, or characteristics may be combined in any suitable manner in one or more embodiments. In the following description, numerous specific details are given to provide a thorough understanding of embodiments of the present disclosure. Those skilled in the art will realize that the technical solutions of the present disclosure may be practiced without one or more of the specific details, or other methods, components, apparatus, steps, etc. may be utilized. In other instances, well-known technical solutions are not shown or described in detail to avoid obscuring respective aspects of the present disclosure.

In addition, the drawings are merely schematic representations of the present disclosure and are not necessarily drawn to scale. The same reference numerals in the drawings represent the same or similar parts, so the repeated description thereof will be omitted. Some of the block diagrams shown in the accompanying drawings are functional entities and do not necessarily correspond to physically or logically separate entities. These functional entities may be implemented in software form, or in one or more hardware modules or integrated circuits, or implemented in different networks and/or processor devices and/or microcontroller devices.

In the related art, the ways of processing massive pictures are for example structured data is stored in Hbase, unstructured picture data is directly stored in Hadoop Distributed File System, and the storage address of the picture is stored in Hbase. However, these ways make the transmission speed too slow.

In this exemplary embodiment, a method for processing massive pictures is provided at first. Referring to FIG. 1, the method for processing massive pictures may comprise the follow steps.

In step S110, matrixes corresponding to a plurality of channels of each picture in massive pictures are acquired, and bit-based layering is performed on each of the matrixes.

In step S120, picture-bit-layered data corresponding to respective channels after bit-based layering is stored according to an inverted index structure, and a picture-layer index record file is generated.

In step S130, all the picture-layer indexes of the picture are decoded according to the picture-layer index record file, and the picture is synthesized according to the decoding result.

In the method for processing massive pictures provided by the exemplary embodiments of the present disclosure, picture-bit-layered data is acquired by performing bit-based layering on the matrixes of each channel of the picture, and the picture-bit-layered data is merged and stored according to the inverted index structure. On the one hand, by performing bit-based layering on the matrixes of each channel of the picture, the redundant storage of repeated information among pictures is avoided, the amount of picture storage is reduced, and the storage space is saved. On the other hand, by merging and storing the picture-bit-layered data according to the inverted index structure, the amount of picture transmission is reduced and thus the speed and efficiency of picture transmission is improved.

Next, steps of the method for processing massive pictures provided in this exemplary embodiment will be specifically explained with reference to FIGS. 1 to 5.

In step S110, matrixes corresponding to a plurality of channels of respective picture in massive pictures are acquired, and the bit-based layering is performed on each of the matrixes.

Figure 2:
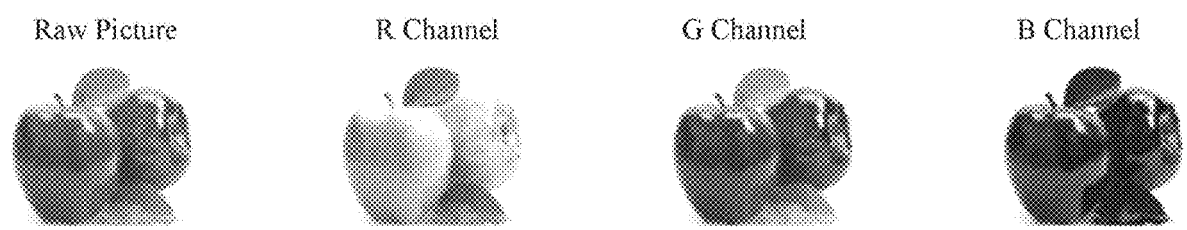
FIG. 2 is a schematic diagram schematically illustrating three channels of a picture in an exemplary embodiment of the present disclosure.

In this exemplary embodiment, the massive pictures may comprise, for example, product pictures, pictures regarding product details, and the like on an e-commerce website, and may also comprise massive pictures on other websites. Each picture is composed of channels. For example, a grayscale image is composed of one channel, and a 32-bit RGB image is composed of three channels R, G, and B. Referring to FIG. 2, in this embodiment, a 32-bit RGB image is used as an example. The matrixes corresponding to a plurality of channels of respective picture may be a partial matrix or a complete matrix, and all the matrixes corresponding to each channel may be acquired by a loop operation. It should be added that each channel is composed of a matrix or matrixes of decimal numbers, that is, each element in the matrix is a decimal element. In this example, referring to FIG. 2, the raw picture in FIG. 2 may be decomposed into R channel, G channel, and B channel, and a bit-based layering may be performed on matrixes which correspond to respective channels corresponding to any one picture.

Specifically, in this exemplary embodiment, performing bit-based layering on each of the matrixes may comprise the following steps: converting each decimal element in the matrixes corresponding to respective channels into binary element, and performing bit-based layering on the matrixes corresponding to respective channels according to a binary bit.

In this exemplary embodiment, each of elements in the matrixes corresponding to each channel is a decimal element, and all decimal elements may be converted into corresponding binary elements. Specifically, the conversion process may be performed by program. Each channel may correspond to a plurality of different matrixes, and each element in each matrix may correspond to a pixel. In this example, the elements in all matrixes corresponding to respective channels may be converted so as to perform the bit-based layering. For example, a part of matrixes of the R channel may be used as an example to illustrate the specific steps of bit-based layering.

Bit-based layering may be interpreted as layering respective binary elements in the matrix according to the number of bits of the binary element. For example, if the number of bits of the binary element is 8, each binary element may be correspondingly decomposed into 8 matrixes.

For example, a small part of matrixes of the R channel is shown in formula (1):

$$R = \begin{bmatrix} 0 & 55 & 41 & 11 \\ 12 & 167 & 27 & 52 \\ 52 & 79 & 185 & 77 \\ 105 & 88 & 30 & 245 \end{bmatrix} \quad (1)$$

Then, converting each decimal elements of the corresponding matrix in formula (1) into binary elements, and corresponding binary matrix shown in formula (2):

$$R = \begin{bmatrix} 0 & 00110111 & 00101001 & 00001011 \\ 00101010 & 10100111 & 00011011 & 00110100 \\ 00110100 & 01001111 & 10111001 & 01001101 \\ 01101001 & 01011000 & 00011110 & 11110101 \end{bmatrix} \quad (2)$$

Each binary element of the R channel matrix may be layered according to a binary bit, and each channel may be decomposed into 8 matrixes according to the binary bit. For example, if decimal number 55 may be converted into binary number 00110111, then element 55 may be decomposed into [0 0 1 1 0 1 1 1]; if decimal number 167 may be converted into binary number 10100111, then element 167 may be correspondingly decomposed into [1 0 1 0 0 1 1 1]. The part of matrixes corresponding to the R channel may be decomposed into 8 matrixes as shown in formula (3). Since all the elements in these 8 matrixes only contain 0 and 1, matrixes corresponding to each channel can be decomposed into eight matrixes according to the binary bit, all these eight matrixes are matrixes which are composed of 0 and 1 (hereinafter, referred to '01 matrix').

$$R1 = \begin{bmatrix} 0 & 1 & 1 & 1 \\ 0 & 1 & 1 & 0 \\ 0 & 1 & 1 & 1 \\ 1 & 0 & 0 & 1 \end{bmatrix} \quad R2 = \begin{bmatrix} 0 & 1 & 0 & 1 \\ 1 & 1 & 1 & 0 \\ 0 & 1 & 0 & 0 \\ 0 & 0 & 1 & 0 \end{bmatrix} \quad (3)$$

$$R3 = \begin{bmatrix} 0 & 1 & 0 & 0 \\ 0 & 1 & 0 & 1 \\ 1 & 1 & 0 & 1 \\ 0 & 1 & 1 & 1 \end{bmatrix} \quad R4 = \begin{bmatrix} 0 & 0 & 1 & 1 \\ 1 & 0 & 1 & 0 \\ 0 & 1 & 1 & 1 \\ 1 & 1 & 1 & 0 \end{bmatrix}$$

$$R5 = \begin{bmatrix} 0 & 1 & 0 & 0 \\ 0 & 0 & 1 & 1 \\ 1 & 0 & 1 & 0 \\ 0 & 1 & 1 & 1 \end{bmatrix} \quad R6 = \begin{bmatrix} 0 & 1 & 1 & 0 \\ 1 & 1 & 0 & 1 \\ 1 & 0 & 1 & 0 \\ 1 & 0 & 0 & 1 \end{bmatrix}$$

$$R7 = \begin{bmatrix} 0 & 0 & 0 & 0 \\ 0 & 0 & 0 & 0 \\ 0 & 1 & 0 & 1 \\ 1 & 1 & 0 & 1 \end{bmatrix} \quad R8 = \begin{bmatrix} 0 & 0 & 0 & 0 \\ 0 & 1 & 0 & 0 \\ 0 & 0 & 1 & 0 \\ 0 & 0 & 0 & 1 \end{bmatrix}$$

In addition, according to the above steps, the bit-based layering may be performed on the matrixes corresponding to the G channel and the B channel based on the binary bit, so as to obtain eight 01 matrixes G1, G2, G3, G4, G5, G6, G7 and G8 corresponding to the G channel, and eight 01 matrixes B1, B2, B3, B4, B5, B6, B7 and B8 corresponding to the B channel. By the bit-based layering in this example, the influence of a lot of redundant information during picture transmission may be avoided, thereby reducing storage amount of pictures.

Further, in this exemplary embodiment, after performing bit-based layering on each of the matrixes, the method may further comprise: performing a calculation of correlation on matrixes corresponding to each layer of respective channels, and acquiring discernibility matrixes corresponding to the correlation; performing run-length encoding on the discernibility matrixes to acquire a plurality of picture-bit-layered data corresponding to each layer of respective channels.

In this exemplary embodiment, firstly, the grayscale processing may be performed on the decomposed pictures of three channels, as shown in FIG. 2. It may be found from FIG. 2 that the grayscale images corresponding to respective channels are similar, so it may be predicted that there must be strong correlation between the corresponding layers of the three groups of decomposed matrixes R1-8, G1-8, and B1-8. In order to verify the correlation between the three groups of decomposed matrixes, in this example, a calculation of correlation is performed on matrixes corresponding to each layer of respective channels. Specific steps are as follows.

Figure 3:
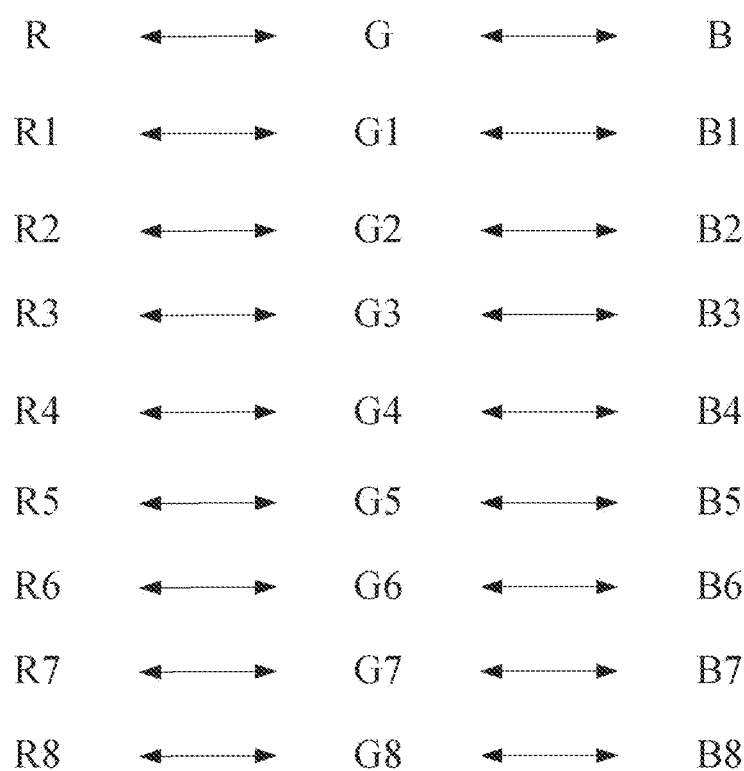
FIG. 3 is a schematic diagram schematically illustrating correlation of decomposed matrixes of three channels in an exemplary embodiment of the present disclosure.
Figure 4:
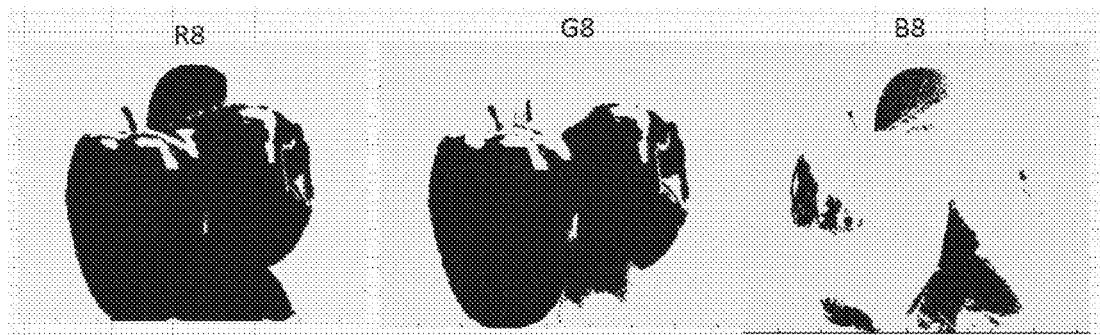
FIG. 4 is a schematic diagram schematically illustrating binary images of the eighth layer of a picture in an exemplary embodiment of the present disclosure.

Specifically, the correspondence relationship among three groups of decomposed matrixes is shown in FIG. 3. From the correspondence relationship diagram, it may be seen that there is a one-to-one correspondence relationship among decomposed matrixes of the same layer of the three channels, for example, R1 corresponds to G1 and B1, respectively, and R8 corresponds to G8 and B8, respectively.

After the correlation among decomposed matrixes of the same layer of the three channels is obtained, the correlation may be represented by discernibility matrixes, and the discernibility matrixes may be obtained using an exclusive OR operation. Further, the decomposed matrix of each layer of the G channel and the B channel may be represented by a decomposed matrix of the R channel corresponding to this layer in combination with the discernibility matrix. As may be seen from FIG. 4, there are strong correlations among binary images corresponding to decomposed matrixes about the eighth layer of three channels. For example, the binary image corresponding to R8 may be regarded as a combination of the binary image corresponding to G8 and the binary image corresponding to B8. In addition, the decomposed matrixes R1, G1, and B1 of the first layer of the three channels may be shown in formula (4).

$$R1 = \begin{bmatrix} 0 & 1 & 1 & 1 \\ 0 & 1 & 1 & 0 \\ 0 & 1 & 1 & 1 \\ 1 & 0 & 0 & 1 \end{bmatrix} \quad (4)$$

$$G1 = \begin{bmatrix} 0 & 1 & 1 & 1 \\ 0 & 1 & 1 & 0 \\ 0 & 1 & 0 & 1 \\ 1 & 0 & 0 & 1 \end{bmatrix}$$

$$B1 = \begin{bmatrix} 0 & 1 & 1 & 1 \\ 0 & 1 & 1 & 0 \\ 0 & 1 & 0 & 0 \\ 1 & 0 & 1 & 1 \end{bmatrix}$$

It may be seen from formula (4) that only one element is different between G1 and R1, and two elements are different between B1 and G1. Therefore, both G1 and B1 may be represented by the form of R1 plus a discernibility matrix, for example, as shown in formula (5), and the discernibility matrix may be completed by an exclusive OR operation. It can be seen that the discernibility matrix G1' and B1' are both sparse matrixes. In this case, R1, G1' and B1' may be recorded. It should be noted that not only R channel can be used for the calculation of correlation. That is to say, in addition, the correlation among the decomposed matrixes of the same layer of three channels may be described with the use of G channel and the discernibility matrix R' and B'. It is also possible to describe the correlation among the decomposed matrixes of the same layer of three channels with the use of B channel and the discernibility matrixes R' and G'.

$$G1' = \begin{bmatrix} 0 & 0 & 0 & 0 \\ 0 & 0 & 0 & 0 \\ 0 & 0 & 1 & 0 \\ 0 & 0 & 0 & 0 \end{bmatrix} \quad (5)$$

$$B1' = \begin{bmatrix} 0 & 0 & 0 & 0 \\ 0 & 0 & 0 & 0 \\ 0 & 0 & 1 & 1 \\ 0 & 0 & 1 & 0 \end{bmatrix}$$

Then, run-length encoding may be performed on the discernibility matrixes to acquire a plurality of picture-bit-layered data corresponding to each layer of respective channels. The run-length encoding method is a lossless compression method, which may replace adjacent pixels with the same color value in a scan line with a count value and the color values of corresponding pixels. For example, aaabcccccddeee may be replaced with 3a1b6c2d3e. Similarly, the character string JJJJJJAAAAVVVVAAAAAA may be encoded in the form of 6J4A4V6A, wherein '6J' means 6 characters J, and '4A' means 4 characters A. The run length encoding method may be adopted to avoid a lot of redundant information and make the picture processing simpler and faster.

In this example, run-length encoding may be performed on the discernibility matrixes to obtain a plurality of picture-bit-layered data corresponding to each layer of respective channels, and there is a one-to-one correspondence relationship between the picture-bit-layered data and the matrix. The picture-bit-layered data may be a data sequence. For example, run-length encoding may be performed on respective sparse matrixes to obtain 24 data sequences, and the picture may be fully expressed by these 24 data sequences. For example, the data sequence obtained by encoding the matrix B1' via the way of compressing is 01410. Said 24 data sequences may be expressed as:

$\overline{R1}, \overline{R2}, \overline{R3}, \overline{R4}, \overline{R5}, \overline{R6}, \overline{R7}, \overline{R8}, \overline{G1}', \overline{G2}', \overline{G3}', \overline{G4}', \overline{G5}',$
$\overline{G6}', \overline{G7}', \overline{G8}', \overline{B1}', \overline{B2}', \overline{B3}', \overline{B4}', \overline{B5}', \overline{B6}', \overline{B7}', \overline{B8}'$ In step S120, the picture-bit-layered data corresponding to respective channels after bit-based layering is stored according to an inverted index structure, and a picture-layer index record file is generated.

In this exemplary embodiment, an inverted index structure may be established at first, and in an actual application, the inverted index structure may determine the position of a record according to an attribute value. The inverted index structure may be an index table, wherein a first column of the index table may be used to store the picture-bit-layered data obtained by performing run-length encoding; a second column of the index table may be used to store index values calculated according to the picture-bit-layered data, the index value may comprise a HashCode index value or an MD5 index value; and a third column of the index table may be used to store picture-layer indexes. If pictures are A, B, C and D, the inverted index structure may be shown as Table 1. The picture-layer index record file may be used to record the process of storing all picture-bit-layered data according to the inverted index structure.

TABLE 1

| Bit-layered data | Index Value | Picture-layer index |
|---|---|---|
| Sequence 1 | 486dfg4dfg4s3245 | PictureA-R1, PictureD-R3 |
| Sequence 2 | Dfg765gdfs76dgf7 | PictureB-R1, PictureC-R7 |
| Sequence 3 | gfGREdsfsdf89fds | PictureA-R2 |
| Sequence 4 | H09jfjfdni0923h4 | PictureC-B3 |
| . . . | . . . | . . . |

Specifically, in this exemplary embodiment, according to an inverted index structure, storing a plurality of picture-bit-layered data corresponding to respective channels after bit-based layering comprises: calculating an index value of the picture-bit-layered data, and finding an index row matching the index value in the inverted index structure; adding a row of picture-layer index record into the inverted index structure, when the index row matching the index value is not found; detecting whether the picture-bit-layered data completely matches with a picture-bit-layered data stored in the index table, when the index row matching the index value is found.

In this exemplary embodiment, an index value corresponding to respective picture-bit-layered data may be calculated at first, that is, a data value stored in a data sequence corresponding to respective layers of respective channels. The index value may comprise a HashCode index value or an MD5 index value. For example, the index value of a data sequence corresponding to respective layers of respective channels may be calculated and acquired through the function loop. Specifically, the bit-based layering may be performed on the picture according to the above steps to obtain 24 data sequences, the data sequence is referred to picture-bit-layered data. Taking the decomposition of picture A as an example, the 24 data sequences are as follows:

$\overline{R1}, \overline{R2}, \overline{R3}, \overline{R4}, \overline{R5}, \overline{R6}, \overline{R7}, \overline{R8}, \overline{G1'}, \overline{G2'}, \overline{G3'}, \overline{G4'}, \overline{G5'}, \overline{G6'}, \overline{G7'}, \overline{G8'}, \overline{B1'}, \overline{B2'}, \overline{B3}, \overline{B4'}, \overline{B5'}, \overline{B6'}, \overline{B7'}, \overline{B8'}$ Then, finding an index row corresponding to or matching the calculated index value in the above index table. If the index row matching the index value is not found, a row of picture-layer index record may be added into the inverted index structure. Referring to table 1 for illustration, for example, if the currently calculated index value of pictureA-R3 is 486dgf4dfg4s3246, which does not match with all the index rows in Table 1, then said data sequence, index value, and corresponding picture-layer index may be added to index table. When the index row matching the index value is found, one may detect whether the picture-bit-layered data completely matches with a picture-bit-layered data stored in the index table. Still referring to Table 1, for example, the currently calculated index value of second-layer in R channel of picture A (pictureA-R2) is gfGREdsfsdf89fds. The process of detecting whether the data sequence used for calculation of the index value completely matches with a data sequence stored in the index table may be continued. At this time, the decision may be made by deciding each element in the matrix corresponding to the data sequence.

Further, in this exemplary embodiment, detecting whether the picture-bit-layered data completely matches with a picture-bit-layered data stored in the index table comprises adding a marker corresponding to a picture-layer into the inverted index structure, when it is detected that the picture-bit-layered data completely matches with a picture-bit-layered data stored in the index table; recalculating the index value, when it is detected that the picture-bit-layered data does not completely match with a picture-bit-layered data stored in the index table.

In this exemplary embodiment, when it is detected that the currently calculated picture-bit-layered data does not completely match or completely mismatch with the picture-bit-layered data stored in the index table, in order to improve the accuracy of the finding, the index value may be recalculated; When it is detected that the currently calculated picture-bit-layered data completely matches a picture-bit-layered data stored in the index table, a picture-layer corresponding to the index value (i.e. the channel and layer serial number of the picture corresponding to the index value) may be marked in the index table. For example, the index value of the second layer in R channel of the picture A is calculated as gfGREdsfsdf89fds, and each element in the matrix corresponding to the data sequence used for calculation of index value is the same as each element of a data sequence stored in the index table, then the marker 'pictureA-R2' corresponding to the second layer in the R channel of the picture A may be recorded in the column of the picture-layer index of the index table.

It should be added that all the above query and index process may be recorded in the picture-layer index record file, and all records in the picture-layer index record file may be used to represent the complete picture.

In step S130, all the picture-layer indexes of the picture are decoded according to the picture-layer index record file, and the picture is generated according to the decoding result.

In this exemplary embodiment, the picture-layer index record file generated in step S120 may be decoded, and the picture generated according to the decoding result is the picture which had been bit-based layered. The decoding process is the inverse of the encoding process, so the encoding method and the decoding method may correspond to each other. In this example, all picture-layer indexes stored in the index table corresponding to a certain picture may be decoded to obtain the original picture data corresponding to the three channels of this picture, so as to obtain the raw picture.

Specifically, in this exemplary embodiment, decoding all the picture-layer indexes of the picture may include decoding all the picture-layer indexes of the picture according to the picture-layer index record file, and finding the compressed picture-bit-layered data corresponding to the picture according to the picture-layer index; performing run-length decoding on the compressed picture-bit-layered data to acquire uncompressed raw picture-bit-layered data matrixes corresponding to the picture; performing exclusive OR operation on the raw picture-bit-layered data matrixes to acquire unlayered raw matrixes corresponding to a plurality of channels of the picture and synthesize the picture according to the raw matrixes.

In this exemplary embodiment, raw data representing the picture may be acquired by processing the data in the lowest level at first and processing one layer by one layer. First, all picture-layer indexes of the picture may be decoded according to the picture-layer index record file. For example, all picture-layer indexes corresponding to picture A can be acquired, which comprise following picture-layer indexes: pictureA-R1-8, pictureA-G1-8 and pictureA-B1-8; then, finding compressed picture-bit-layered data corresponding to the picture-layer according to the picture-layer index, that is, finding data sequences corresponding to all the picture-layer indexes of picture A in the index table, for example, acquiring a data sequence 01410. It should be noted that the data sequence acquired herein is a data sequence compressed by way of run-length encoding.

Further, run-length decoding may be performed on the compressed data sequences which have been acquired, in order to acquire a raw data matrix without the processing of encoding compression. For example, run-length decoding may be performed to the data sequence 01410 to acquire the corresponding raw matrix B1'. Here, the obtained 24 data sequences may be decoded cyclically to obtain the uncompressed 24 raw picture-bit-layered data matrixes:

$\overline{R1}, \overline{R2}, \overline{R3}, \overline{R4}, \overline{R5}, \overline{R6}, \overline{R7}, \overline{R8}, \overline{G1'}, \overline{G2'}, \overline{G3'}, \overline{G4'}, \overline{G5'}, \overline{G6'}, \overline{G7'}, \overline{G8'}, \overline{B1'}, \overline{B2'}, \overline{B3'}, \overline{B4'}, \overline{B5'}, \overline{B6'}, \overline{B7'}, \overline{B8'}$ Since the discernibility matrixes G1' and B1' in the 24 raw picture-bit-layered data matrixes obtained above may be obtained by exclusive OR operation, the exclusive OR operation may be performed on the discernibility matrixes G1' and B1' again to restore the raw matrix $\overline{R1\text{-}8}, \overline{G1\text{-}8}, \overline{B1\text{-}8}$ without any processing. Herein, said $\overline{R1\text{-}8}, \overline{G1\text{-}8}, \overline{B1\text{-}8}$ represent the matrixes corresponding to the first layer to the eighth layer of three channels R, G and B, respectively, which may be used to respectively represent the three channels of RGB, and finally the original raw picture may be synthesized though three channels. By compressing picture information by way of encoding, the network transmission bandwidth may be saved, thereby increasing the picture transmission rate, and then by decoding picture information, storage space may be saved.

In addition, in this exemplary embodiment, the method may further comprise checking the picture generated according to the decoding result by the use of the index value.

In this exemplary embodiment, in order to ensure the accuracy of picture transmission, a picture generated after decoding may be checked to decide whether the picture is consistent with the raw picture which had been bit-based layered. Of course, the checking process may not be performed. The specific checking process may be completed by a program, which will not describe here anymore.

It should be added that what is specifically described in this example is only the process of processing one picture, and further, massive pictures may be processed by circularly combining the processes of bit-based layering, encoding storage, decoding and the like according to the present invention. In this example, starting from reducing the redundant information among massive pictures information, the massive pictures are decomposed based on layer and then merged and stored in the dimension of layers, which reduces the storage and transmission of pictures, saves storage space, and improves transmission efficiency.

Figure 5:
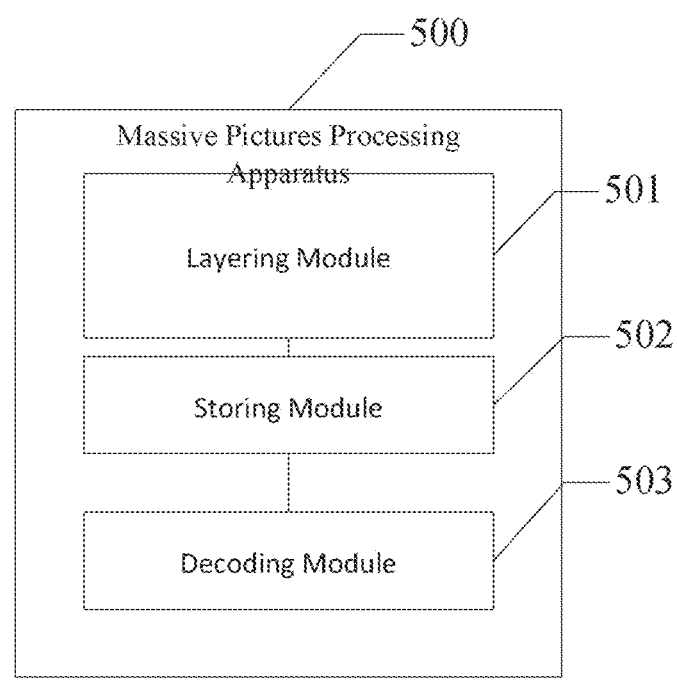
FIG. 5 is a block diagram schematically illustrating an apparatus for processing massive pictures in an exemplary embodiment of the present disclosure.

In this exemplary embodiment, there is provided an apparatus for processing massive pictures. Referring to FIG. 5, the apparatus 500 may comprise a layering module 501, a storing module 502 and a decoding module 503.

The layering module 501 is configured to acquire matrixes corresponding to a plurality of channels of respective picture in massive pictures, and perform bit-based layering on each of the matrixes. The storing module 502 is configured to store, according to an inverted index structure, a plurality of picture-bit-layered data corresponding to respective channels after bit-based layering, and generate a picture-layer index record file; wherein, the inverted index structure comprises a plurality of picture-layer indexes. The decoding module 503 is configured to decode all the picture-layer indexes of the picture according to the picture-layer index record file, and synthesize the picture according to the decoding result.

The details of each module in the above-mentioned massive pictures processing apparatus have been described in the corresponding massive pictures processing method, so it will not be repeated here.

It should be noticed that, although several modules or units of apparatus for action execution are mentioned in the detailed description above, such division is not mandatory. Indeed, according to embodiments of the present disclosure, the features and functions of two or more modules or units described above may be embodied in one circuit or unit. Conversely, the features and functions of one of the modules or units described above may be further divided into a plurality of modules or units to embody.

In addition, although various steps of the methods in the present disclosure are described in a specific order in the accompanying drawings, this is not required or implied that the steps must be performed in this specific order, or a desired result may be realized must by performing all the steps shown. Additionally or alternatively, certain steps may be omitted, a plurality of steps may be combined into one step to execute, and/or one step may be decomposed into a plurality of steps to execute, and the like.

In an exemplary embodiment of the present disclosure, there is provided an electronic device capable of implementing the above method.

Those skilled in the art may understand that various aspects of the present invention may be implemented as a system, method, or program product. Therefore, various aspects of the present invention may be embodied in the following forms: a complete hardware implementation, a complete software implementation (including firmware, microcode, etc.), or a combination of hardware and software, which may be collectively referred to herein 'circuit', 'module', or 'system'.

The electronic device 600 according to this embodiment of the present invention is described below with reference to FIG. 6. The electronic device 600 shown in FIG. 6 is merely an example, and should not impose any limitation on the functions and scope of use of the embodiment of the present invention.

Figure 6:
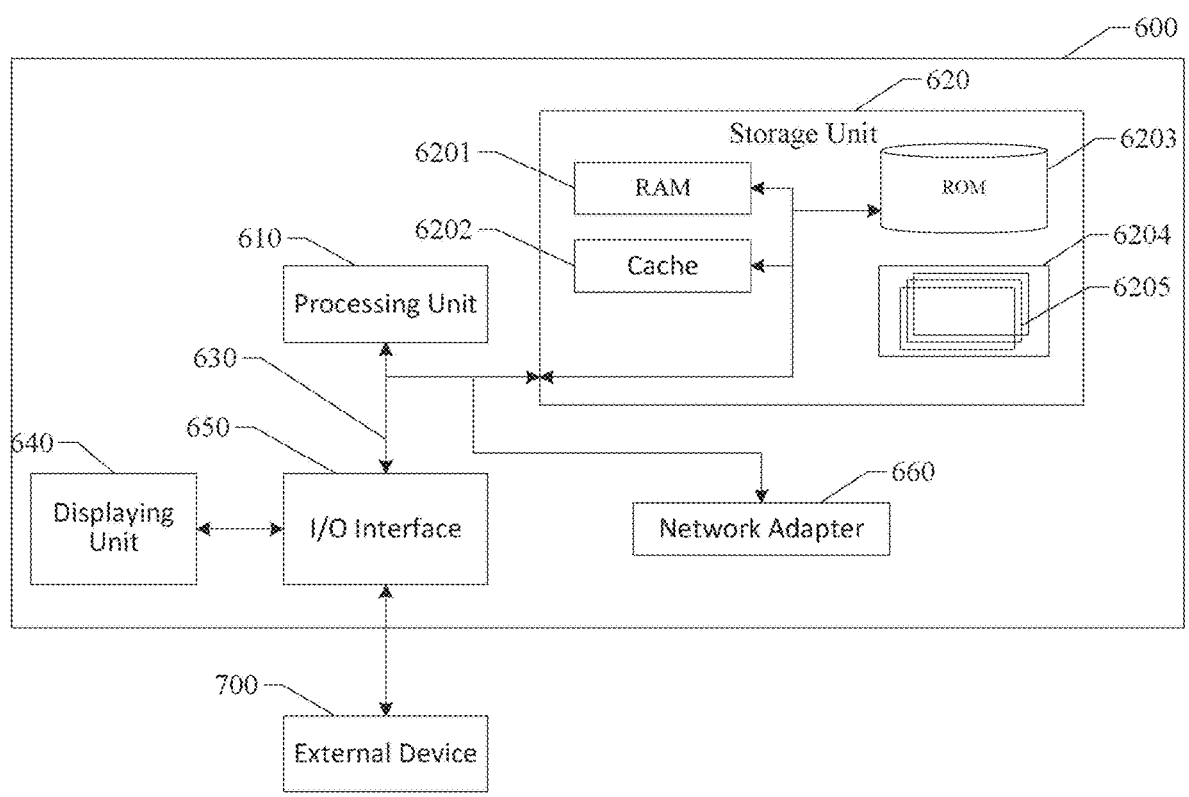
FIG. 6 schematically illustrates an electronic device in an exemplary embodiment of the present disclosure.

As shown in FIG. 6, the electronic device 600 is expressed in the form of a general-purpose computing device. The components of the electronic device 600 may comprise, but are not limited to, at least one processing unit 610, at least one storage unit 620, and a bus 630 connecting different system components (including the storage unit 620 and the processing unit 610).

In the example above, the storage unit stores program codes, and the program codes may be executed by the processing unit 610, so that the processing unit 610 executes various steps of the exemplary embodiments according to the present invention described in the above-mentioned 'exemplary method' in the specification. For example, the processing unit 610 may perform the above steps.

The storage unit 620 may comprise a readable medium in the form of a volatile storage unit, such as a random access storage unit (RAM) 6201 and/or a cache storage unit 6202, and may further comprise a read-only storage unit (ROM) 6203.

The storage unit 620 may further comprise a program/utility tool 6204 having a set of (at least one) program modules 6205. Such program modules 6205 comprise, but are not limited to, an operating system, one or more application programs, other program modules, and program data. Each or some combination of these examples may comprise an implementation of a network environment.

The bus 630 may be one or more of several types representing bus structures, comprising a storage unit bus or a storage unit controller, a peripheral bus, a graphics acceleration port, a processing unit, or a local bus that uses any bus structure in a variety of bus structures.

The electronic device 600 may also communicate with one or more external devices 700 (such as a keyboard, pointing device, Bluetooth device, etc.), may also communicate with one or more devices that enable a user to interact with the electronic device 600, and/or with any device (e.g., router, modem, etc.) that enables the electronic device 600 to communicate with one or more other computing devices. This communication may be performed through an input/output (I/O) interface 650. Moreover, the electronic device 600 may also communicate with one or more networks (such as a local area network (LAN), a wide area network (WAN), and/or a public network, such as the Internet) through the network adapter 660. As shown, the network adapter 660 communicates with other modules of the electronic device 600 through the bus 630. It should be understood that although not shown in the figure, other hardware and/or software modules may be used in conjunction with the electronic device 600, comprising but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

In an exemplary embodiment of the present disclosure, there is also provided a computer-readable storage medium on which a program product capable of implementing the above-mentioned method of the present specification is stored. In some possible implementation manners, aspects of the present invention may also be implemented in the form of a program product, which comprises program code. When the program product runs on a terminal device, the program code is used to make the terminal device perform the steps according to various exemplary embodiments of the present invention described in the above-mentioned "exemplary method" section of this specification.

Figure 7:
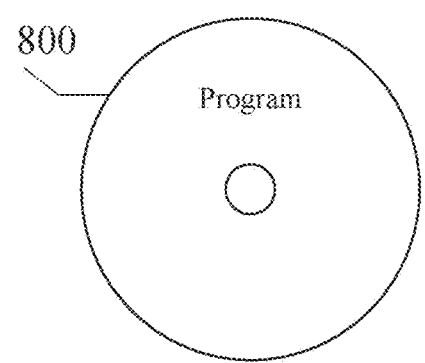
FIG. 7 schematically illustrates a program product in an exemplary embodiment of the present disclosure.

Referring to FIG. 7, a program product 800 for implementing the above method according to an embodiment of the present invention is described. The program product 800 can use a portable compact disc read-only memory (CD-ROM) and include the program code, which may run on a terminal device, for example, personal computer. However, the program product of the present invention is not limited thereto. In this document, the readable storage medium may be tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media comprise: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may comprise a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, comprising but not limited to wireless, wired, optical cable, RF, etc., or any suitable combination of the foregoing.

The program code for performing the operations of the present invention may be written in any combination of one or more programming languages, which comprise object-oriented programming languages, such as Java. C++, etc. and further comprise conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of process comprised in the method of the exemplary embodiment of the present invention, and are not intended to limit the purpose. It is easy to understand that the processes shown in the above drawings does not indicate or limit the chronological order of these processes. In addition, it is also easy to understand that these processes may be performed synchronously or asynchronously in a plurality of modules, for example.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

What is claimed is:

1. A method for processing massive pictures, the method comprising:
    acquiring matrixes corresponding to a plurality of channels of respective picture in massive pictures, and performing bit-based layering on respective matrixes;
    storing, according to an inverted index structure, picture-bit-layered data corresponding to respective channels after bit-based layering, and generating a picture-layer index record file, wherein the inverted index structure comprises a plurality of picture-layer indexes; and
    decoding all the picture-layer indexes of the picture according to the picture-layer index record file and synthesizing the picture according to the decoding result.

2. The method for processing massive pictures according to claim 1, wherein performing bit-based layering on respective matrixes comprising:
    converting respective decimal element in the matrixes corresponding to respective channels into binary element, and performing bit-based layering on the matrixes corresponding to respective channels according to a binary bit.

3. The method for processing massive pictures according to claim 1, wherein after performing hit-based layering on respective matrixes, the method further comprises:

performing a calculation of correlation on matrixes corresponding to each layer of respective channels, and acquiring discernibility matrixes corresponding to the correlation; and performing run-length encoding on the discernibility matrixes to acquire a plurality of picture-bit-layered data corresponding to each layer of respective channels.

4. The method for processing massive pictures according to claim 1, wherein storing, according to an inverted index structure, picture-bit-layered data corresponding to respective channels after bit-based layering comprising:

calculating an index value of the picture-bit-layered data; and finding an index row matching the index value in the inverted index structure;

adding a row of picture-layer index record into the inverted index structure, when the index row matching the index value is not found; and detecting whether the picture-bit-layered data completely matches with a picture-bit-layered data stored in the inverted index structure, when the index row matching the index value is found.

5. The method for processing massive pictures according to claim 4, wherein detecting whether the picture-bit-layered data completely matches with a picture-bit-layered data stored in the inverted index structure comprising:

adding a marker corresponding to a picture-layer into the inverted index structure, when it is detected that the picture-bit-layered data completely matches with a picture-bit-layered data stored in the inverted index structure; and recalculating the index value, when it is detected that the picture-bit-layered data does not completely match with a picture-bit-layered data stored in the inverted index structure.

6. The method for processing massive pictures according to claim 1, wherein decoding all the picture-layer indexes of the picture comprising decoding all the picture-layer indexes of the picture according to the picture-layer index record file, and finding compressed picture-bit-layered data corresponding to the picture according to the picture-layer index;

performing run-length decoding on the compressed picture-bit-layered data to acquire uncompressed raw picture-bit-layered data matrixes corresponding to the picture; and performing exclusive OR operation on the raw picture-bit-layered data matrixes to acquire unlayered raw matrixes corresponding to a plurality of channels of the picture and synthesize the picture according to the raw matrixes.

7. The method for processing massive pictures according to claim 4, the method further comprising:

checking the picture generated according to the decoding result by the use of the index value.

8. A computer-readable storage medium having stored a computer program thereon, the computer program is executed by a processor to implement a method for processing massive pictures, wherein the method for processing massive pictures comprises:

acquiring matrixes corresponding to a plurality of channels of respective picture in massive pictures, and performing bit-based layering on respective matrixes;

storing, according to an inverted index structure, picture-bit-layered data corresponding to respective channels after bit-based layering, and generating a picture-layer index record file, wherein the inverted index structure comprises a plurality of picture-layer indexes; and decoding all the picture-layer indexes of the picture according to the picture-layer index record file and synthesizing the picture according to the decoding result.

9. A electronic device for processing massive pictures, comprising:

a processor; and a memory for storing executable instructions of the processor;

wherein, the processor is configured to perform a method for processing massive pictures by executing the executable instruction, wherein the method for processing massive pictures comprises:

acquiring matrixes corresponding to a plurality of channels of respective picture in massive pictures, and performing bit-based layering on respective matrixes;

storing, according to an inverted index structure, picture-bit-layered data corresponding to respective channels after bit-based layering, and generating a picture-layer index record file, wherein the inverted index structure comprises a plurality of picture-layer indexes; and decoding all the picture-layer indexes of the picture according to the picture-layer index record file and synthesizing the picture according to the decoding result.

10. The computer-readable storage medium according to claim 8, wherein performing bit-based layering on respective matrixes comprising:

converting respective decimal element in the matrixes corresponding to respective channels into binary element, and performing bit-based layering on the matrixes corresponding to respective channels according to a binary bit.

11. The computer-readable storage medium according to claim 8, Wherein after performing bit-based layering on respective matrixes, the method further comprises:

performing a calculation of correlation on matrixes corresponding to each layer of respective channels, and acquiring discernibility matrixes corresponding to the correlation; and performing run-length encoding on the discernibility matrixes to acquire a plurality of picture-bit-layered data corresponding to each layer of respective channels.

12. The computer-readable storage medium according to claim 8, wherein storing, according to an inverted index structure, picture-bit-layered data corresponding to respective channels after bit-based layering comprising:

calculating an index value of the picture-bit-layered data, and finding an index row matching the index value in the inverted index structure;

adding a row of picture-layer index record into the inverted index structure, when the index row matching the index value is not found; and detecting whether the picture-bit-layered data completely matches with a picture-bit-layered data stored in the inverted index structure, when the index row matching the index value is found.

13. The computer-readable storage medium according to claim 12, wherein detecting whether the picture-bit-layered data completely matches with a picture-bit-layered data stored in the inverted index structure comprising:

adding a marker corresponding to a picture-layer into the inverted index structure, when it is detected that the picture-bit-layered data completely matches with a picture-bit-layered data stored in the inverted index structure; and recalculating the index value, when it is detected that the picture-bit-layered data does not completely match with a picture-bit-layered data stored in the inverted index structure.

14. The computer-readable storage medium according to claim 8, wherein decoding all the picture-layer indexes of the picture comprising:

decoding all the picture-layer indexes of the picture according to the picture-layer index record file, and finding compressed picture-hit-layered data corresponding to the picture according to the picture-layer index;

performing run-length decoding on the compressed picture-bit-layered data to acquire uncompressed raw picture-bit-layered data matrixes corresponding to the picture; and performing exclusive OR operation on the raw picture-bit-layered data matrixes to acquire unlayered raw matrixes corresponding to a plurality of channels of the picture and synthesize the picture according to the raw matrixes.

15. The computer-readable storage medium according to claim 12, wherein the method further comprising:

checking the picture generated according to the decoding result by the use of the index value.

16. The electronic device for processing massive pictures according to claim 9, wherein performing hit-based layering on respective matrixes comprising:

converting respective decimal element in the matrixes corresponding to respective channels into binary element, and performing bit-based layering on the matrixes corresponding to respective channels according to a binary bit.

17. The electronic device for processing massive pictures according to claim 9, wherein after performing bit-based layering on respective matrixes, the method further comprises:

performing a calculation of correlation on matrixes corresponding to each layer of respective channels, and acquiring discernibility matrixes corresponding to the correlation; and performing run-length encoding on the discernibility matrixes to acquire a plurality of picture-bit-layered data corresponding to each layer of respective channels.

18. The electronic device for processing massive pictures according to claim 9, wherein storing, according to an inverted index structure, picture-bit-layered data corresponding to respective channels after bit-based layering comprising:

calculating an index value of the picture-bit-layered data, and finding an index row matching the index value in the inverted index structure;

adding a row of picture-layer index record into the inverted index structure, when the index row matching the index value is not found; and detecting whether the picture-bit-layered data completely matches with a picture-bit-layered data stored in the inverted index structure, when the index row matching the index value is found.

19. The electronic device for processing massive pictures according to claim 18, wherein detecting whether the picture-bit-layered data completely matches with a picture-bit-layered data stored in the inverted index structure comprising:

adding a marker corresponding to a picture-layer into the inverted index structure, when it is detected that the picture-bit-layered data completely matches with a picture-bit-layered data stored in the inverted index structure; and recalculating the index value, when it is detected that the picture-bit-layered data does not completely match with a picture-bit-layered data stored in the inverted index structure.

20. The electronic device for processing massive pictures according to claim 9, wherein decoding all the picture-layer indexes of the picture comprising:

decoding all the picture-layer indexes of the picture according to the picture-layer index record file, and finding compressed picture-bit-layered data corresponding to the picture according to the picture-layer index;

performing run-length decoding on the compressed picture-bit-layered data to acquire uncompressed raw picture-bit-layered data matrixes corresponding to the picture; and performing exclusive OR operation on the raw picture-bit-layered data matrixes to acquire unlayered raw matrixes corresponding to a plurality of channels of the picture and synthesize the picture according to the raw matrixes.

* * * * *